United States Patent [19]
Albrecht et al.

[11] Patent Number: 6,034,841
[45] Date of Patent: Mar. 7, 2000

[54] DISK DRIVE WITH COMPOSITE SHEET METAL AND ENCAPSULATED PLASTIC BASE

[75] Inventors: Thomas Robert Albrecht, San Jose, Calif.; Vijayeshwar Das Khanna, Ossining, N.Y.; Suresh Kumar, New Delhi, India; Sri Muthuthamby Sri-Jayantha, Ossining, N.Y.

[73] Assignee: International Business Machines Corporation, Armonk, N.Y.

[21] Appl. No.: 09/087,336

[22] Filed: May 29, 1998

[51] Int. Cl.[7] ..................................................... G11B 5/012
[52] U.S. Cl. .......................................................... 360/97.01
[58] Field of Search .............................. 360/97.01, 98.01, 360/97.03; 361/685, 739

[56] References Cited

U.S. PATENT DOCUMENTS

| | | | |
|---|---|---|---|
| 4,980,786 | 12/1990 | O'Sullivan et al. | 360/97.03 |
| 5,004,207 | 4/1991 | Ishikawa et al. | 360/97.02 |
| 5,025,335 | 6/1991 | Stefansky | 360/97.01 |
| 5,223,993 | 6/1993 | Squires et al. | 360/77.08 |
| 5,223,996 | 6/1993 | Read et al. | 360/97.02 |
| 5,243,495 | 9/1993 | Read et al. | 361/685 |
| 5,414,574 | 5/1995 | Boutaghou et al. | 360/97.01 |
| 5,483,398 | 1/1996 | Boutaghou | 360/97.02 |
| 5,596,461 | 1/1997 | Stefansky | 360/97.01 |
| 5,703,734 | 12/1997 | Berberich et al. | 360/97.02 |

OTHER PUBLICATIONS

Z.E. Boutaghou, et al., "Low Profile Hybrid Disk Enclosure", IBM Technical Disclosure Bulletin, vol. 36, No. 08, Aug. 1993, pp. 61–63.

*Primary Examiner*—David D. Davis
*Attorney, Agent, or Firm*—Thomas R. Berthold

[57] ABSTRACT

A miniature removable disk drive that meets the Compact-Flash type II form factor and interface specifications uses a composite sheet metal/plastic tub-shaped base for supporting the disk drive components, e.g., the spindle motor with attached disk, the voice coil motor actuator with attached read/write head, and the preamplifier/write driver electronics module. The composite base is a metal plate with a flange extending around its perimeter and a plastic frame that encapsulates the flange and surrounds the perimeter of the metal plate. The metal plate supports the disk drive spindle motor and voice coil motor actuator and is made of high magnetic permeability, low coercivity material so that it can form part of the magnetic circuit of the spindle motor and/or actuator. The flanges on the metal plate provide rigidity and allow the base to be fabricated by injection molding the plastic frame onto the metal base so that the plastic encapsulates the metal flanges to form the walls of the tub-shaped base. An electronics card is located beneath the metal plate and is electrically shielded from the read/write heads and electronics module by the metal plate. Top and bottom covers are attached to the frame to enclose the disk drive components and the electronics card. Because the frame is made of plastic the corners may be made with intricately shaped cutouts that allow elastomeric corner bumpers to be interlocked into the frame at the corners. The corner bumpers extend beyond the frame and the covers so as to provide shock protection if the miniature removable disk drive is dropped.

18 Claims, 6 Drawing Sheets

DISK DRIVE WITH COMPOSITE SHEET METAL AND ENCAPSULATED PLASTIC BASE

TECHNICAL FIELD

This invention relates to a base or baseplate used to support and house the components of a rigid magnetic recording disk drive.

BACKGROUND OF THE INVENTION

Baseplates or bases for data recording disk drives, such as rigid magnetic recording disk drives, are complex three-dimensional structures that provide a rigid and precise platform upon which multiple mechanical and electronic components are mounted. Prior art disk drives typically use a machined die-cast aluminum baseplate since it has the following properties: 1) a die-cast structure allows a variety of three-dimensional geometries; 2) metal material has high strength and dimensional stability; 3) a die-cast structure can be easily machined to provide tight-tolerance datums and features to accept fasteners; 4) the material is electrically conductive for electrical shielding; and 5) the material is low cost.

Die-cast aluminum baseplates have the following limitations: 1) it is difficult to achieve tolerances tighter than about 0.15 mm without post-machining; 2) wall thicknesses less than 0.5 mm are difficult to achieve; 3) tight-tolerance features are limited to shapes which can be made by casting and post-machining with an end-mill; and 4) they typically require a polymer coating to guarantee an air-tight seal for contamination control and to prevent surface corrosion. While these limitations have not posed problems for large, e.g., 2.5" or 3.5" form factor disk drives, they place significant constraints on baseplates designed for smaller drives, such as a miniature disk drive designed for digital cameras and hand-held or palm-size computing devices. In addition, the cost advantage of die-cast aluminum disappears for small baseplates since the bulk material cost becomes small compared to the machining and coating costs, which do not scale down linearly with baseplate size.

Plastic has been considered previously as a baseplate material for large disk drives. U.S. Pat. No. 5,025,335 describes a 3.5" disk drive with a base and cover of molded plastic. However, the use of plastic alone for a baseplate has several disadvantages: 1) plastic requires a conductive coating or filler in order to be electrically conducting, and even with such measures, its conductivity is inferior to aluminum; 2) low-cost plastics are less rigid than aluminum; 3) dimensional stability is inferior to aluminum due to creep and lower phase transition temperature; and 4) some plastic materials can outgas harmful vapors into the interior of the disk drive.

A composite sheet metal and plastic base for a 2.5" removable disk drive that uses a plastic skeleton-like sheet with a sheet metal insert in an inner portion of the plastic sheet is described in U.S. Pat. No. 5,243,495. The metal insert, which supports the disk drive actuator and spindle motor, is glued or heat staked to the plastic sheet at various locations around its periphery. This semi-flexible bonding of the metal insert to the plastic sheet is designed to provide shock damping for the components mounted on the metal insert. Because the metal insert covers only an inner portion of the plastic sheet the composite base does not provide rigidity to the base and does not electrically shield the components from the electronics card mounted beneath the base.

What is needed is a disk drive base that is sufficiently rigid and provides adequate electrical shielding, but is also low cost and allows tolerances superior to die casting, such that post-machining of datums is not necessary.

SUMMARY OF THE INVENTION

The invention is a miniature removable disk drive that meets the CompactFlash type II form factor and interface specifications. The disk drive uses a composite sheet metal/plastic tub-shaped base for supporting the disk drive components, e.g., the spindle motor with attached disk, the voice coil motor actuator with attached read/write head, and the preamplifier/write driver electronics module. The composite base is a metal plate with a flange extending around its perimeter and a plastic frame that encapsulates the flange and surrounds the perimeter of the metal plate. The metal plate supports the disk drive spindle motor and voice coil motor actuator and is made of high magnetic permeability, low coercivity material so that it can form part of the magnetic circuit of the spindle motor and/or actuator. The flanges on the metal plate provide rigidity and allow the base to be fabricated by injection molding the plastic frame onto the metal base so that the plastic encapsulates the metal flanges to form the walls of the tub-shaped base. An electronics card is located beneath the metal plate and is electrically shielded from the read/write heads and electronics module by the metal plate. Top and bottom covers are attached to the frame to enclose the disk drive components and the electronics card. Because the frame is made of plastic the corners may be made with intricately shaped cutouts that allow elastomeric corner bumpers to be interlocked into the frame at the corners. The corner bumpers extend beyond the frame and the covers so as to provide shock protection if the miniature removable disk drive is dropped.

For a fuller understanding of the nature and advantages of the present invention, reference should be made to the following detailed description taken together with the accompanying figures.

DESCRIPTION OF THE PREFERRED EMBODIMENTS

Figure 1:
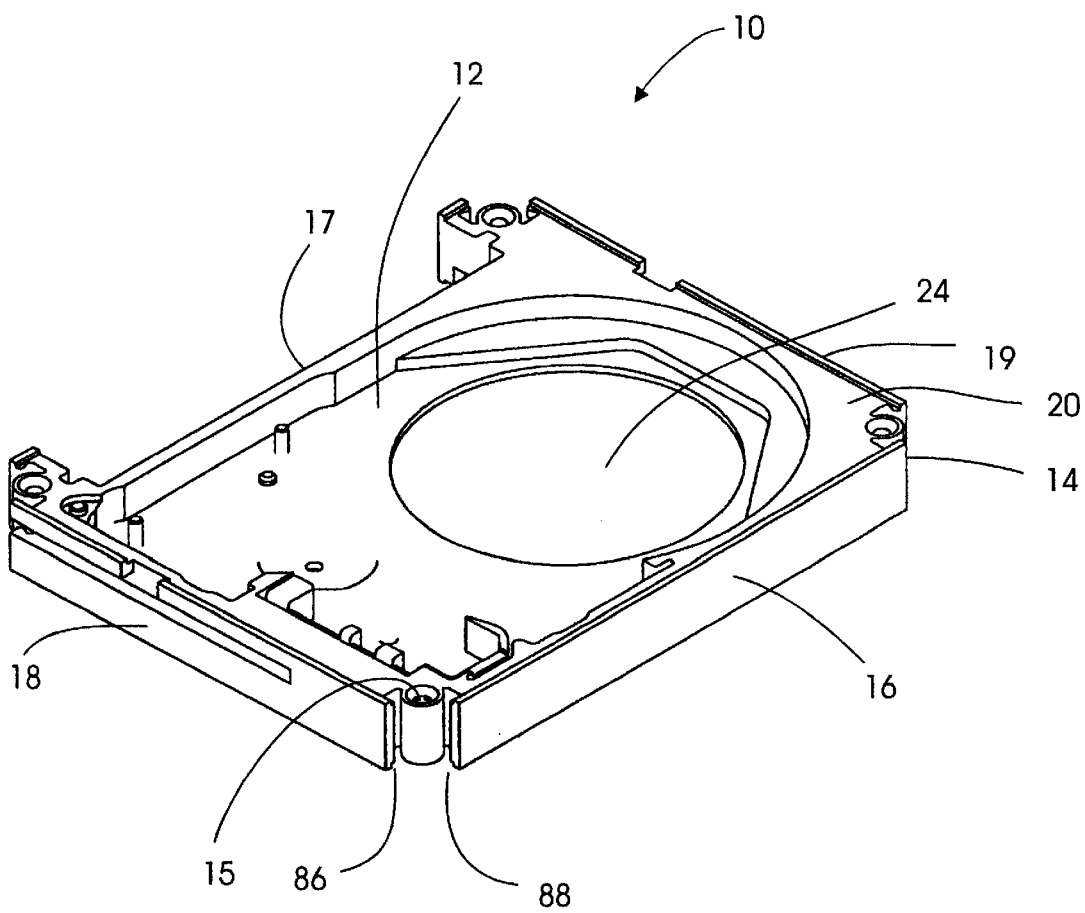
FIG. 1 is a perspective view of the composite disk drive base of the present invention.

A composite sheet metal/plastic base 10 for a miniature magnetic recording disk drive is shown in FIG. 1. The base 10 has a tub shape with the floor of the tub being a sheet metal plate 12. A plastic frame 14 surrounds the perimeter of the plate 12 and is integrally formed with the plate 12 by means of injection molding to the plate 12. The plastic frame 14 has a generally rectangular perimeter defined by walls 16,17,18,19, and an interior body 20. At least one magnetic recording disk, the spindle motor for rotating the disk, the read/write heads, the voice coil motor actuator that supports and moves the heads across the surfaces of the disk, and other components are mounted inside the tub, while the disk drive's electronics board or card attaches to the bottom of base 10. Top and bottom covers (not shown) are attached to the base 10 at the threaded corner bores, such as bore 15. Top and bottom gaskets (not shown) are located between the frame 14 and the covers to form a sealed enclosure. The base 10 includes a mounting interface for the host connector and has dimensions of 36.4 mm×42.8 mm×5 mm that meet the CompactFlash type II (CF-II) form factor and interface specifications. The primary applications of the miniature disk drive is for digital cameras and hand-held or palm-size computing devices.

Figure 2:
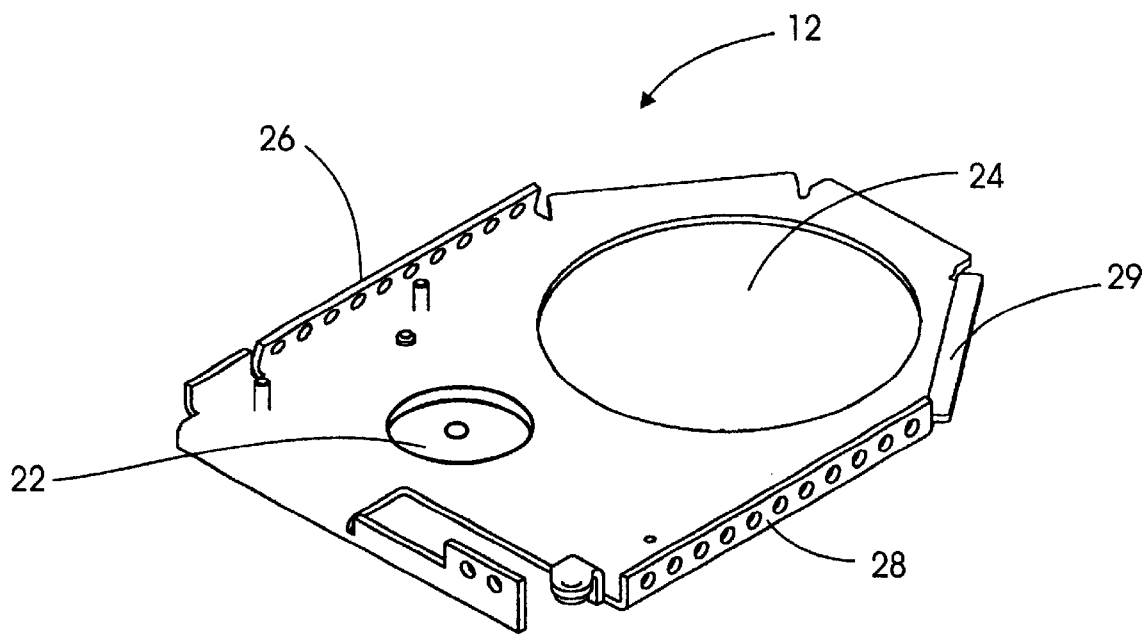
FIG. 2 is a perspective view of the sheet metal plate used in the composite disk drive base of the present invention.

The sheet metal plate 12 is shown in FIG. 2. The plate provides features for mounting the disk drive components, such as the depression or recess 22 with a hole for the actuator pivot bearing, and an opening 24 for mounting of a self-contained spindle motor assembly. Since the relative positioning of these components is critical, all of these features are referenced to the sheet metal alone. The sheet metal can also be formed to provide mounting surfaces at different heights, and to accommodate components of various heights both above and below the floor. Flanges, such as side wall flanges 26, 28 with holes and lip-type flanges like flange 29, are provided around the perimeter of the plate 12. The flanges stiffen the sheet metal plate 12 and the completed base 10. They also provide features, such as holes, for mechanically interlocking the metal plate 12 to the walls of the plastic frame 14. This provides for an air-tight seal and positive attachment of the metal to the plastic. In addition, because the flanges become encapsulated by the walls of the plastic frame, they provide electrical shielding in the walls of the completed base 10. Also, because the metal plate 12 covers substantially the entire surface area of the floor of the base 10, it shields the preamplifier/write driver electronics module (located on the actuator arm or flex cables attached to the arm), and the read/write heads and their wire connections from the electronics card that is mounted to the plastic frame 14 beneath plate 12.

Figure 3A:
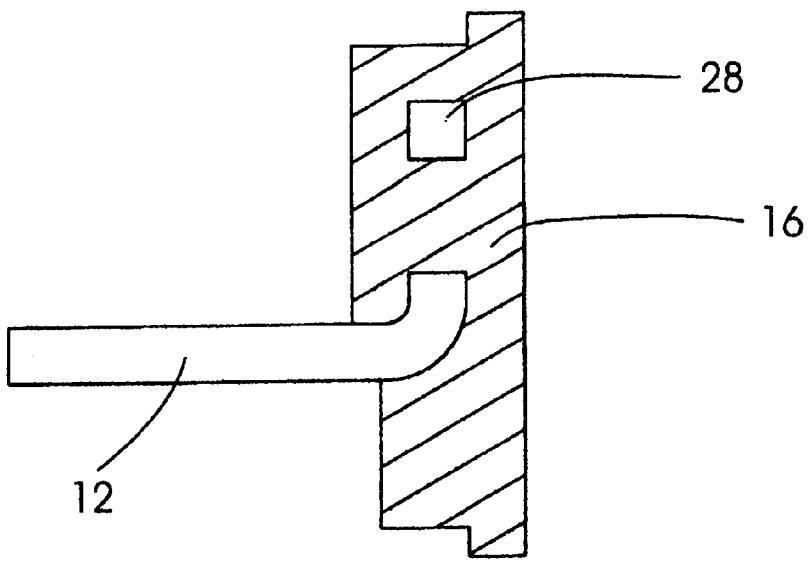
FIG. 3A is a sectional view of a wall of the base showing the injection molded attachment of the plastic frame to a perpendicular flange of the metal plate.
Figure 3B:
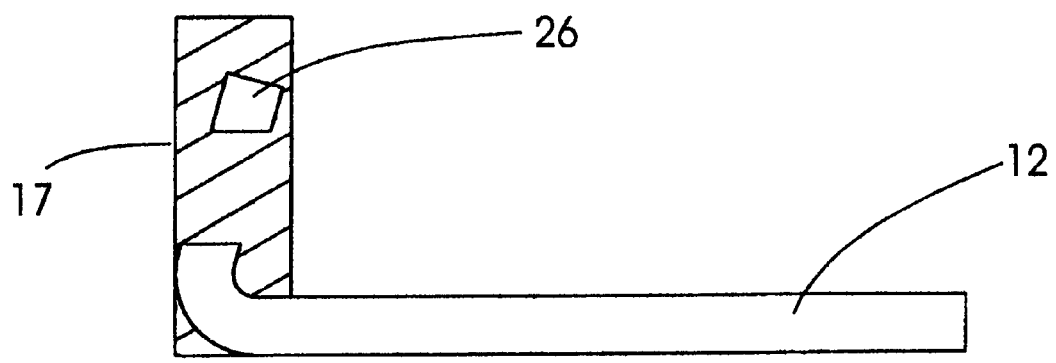
FIG. 3B is a sectional view of a wall of the base showing the injection molded attachment of the plastic frame to a sloped flange of the metal plate.

The holes in the flanges provide mechanical interlock between metal and plastic, as shown in FIGS. 3A and 3B, when the plastic flows during the injection molding process. FIG. 3A is a sectional view of wall 16 showing the manner in which the plastic is incoporated in the holes of flange 28. The flange 28 is one which extends generally perpendicularly from the floor of plate 12. FIG. 3B is a sectional view of wall 17 showing the manner in which the plastic is incoporated in the holes of a sloped flange 26. The sloped flange 26 is one which extends at a nonperpendicular angle, e.g., an acute angle in FIG. 2 and 3B, from the floor of plate 12 to allow the wall 17 to be made thinner than wall 16, if desired. This is accomplished because the plastic flows on one side of the flange 26 near the bottom of the flange and on the opposite side of the flange 26 near the top of the wall 17. The sloped flange may also extend at an obtuse angle from the floor of plate 12 so that it slopes outwardly, instead of inwardly like flange 26.

To prevent deformation of the composite base 10 due to differential thermal expansion, it is advantageous to match the thermal expansion coefficients of the plastic and metal used in the structure. Since most plastics have thermal expansion rates greater than those of metals, nonplastic fillers can be used in the plastic to lower its coefficient of thermal expansion. For example, fillers such as glass beads, fiberglass, carbon fiber, graphite, or metal particles can be used in correct proportions with the plastic to more closely match the thermal expansion rate of the plastic frame 14 to the metal plate 12. Fillers can also be used to provide electrical conductivity in the plastic frame 14 for control of static charges, or to provide electrical shielding in regions of the base where there is no metal.

A wide variety of plastics can be used for the plastic frame 14. Those suitable for use in disk drives include liquid crystal polymers (which can be molded to achieve very tight tolerances), such as Vectra brand from Hoechst-Celanese, Xydar brand from Amoco, or Zenite brand from DuPont, or conventional polymers such as polycarbonate, polyimide, polyphenylene sulfide, polysulfone, nylon, and polyetherimide.

Figure 4:
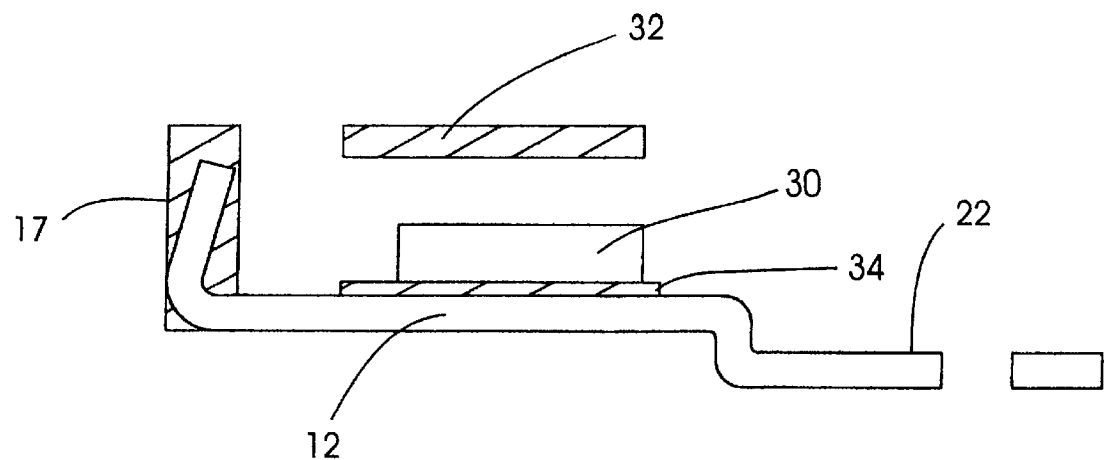
FIG. 4 is a sectional view of a portion of the base showing the metal plate as part of the magnetic circuit of the magnet assembly of the voice coil motor actuator.

The sheet metal insert may be made of soft magnetic material, i.e., high permeability, low coercivity material, such as permalloy, permendur, 1010 steel, or iron. The sheet metal is preferably either plated with a material like nickel, or coated with a polymer coating, to prevent surface corrosion. The use of soft magnetic material allows the sheet metal plate 12 in the base 10 to serve as part of the magnetic structure of the voice coil motor actuator and/or spindle motor. FIG. 4 is a sectional view showing a voice coil motor magnet assembly wherein the floor of plate 12 serves as a portion of the bottom yoke of a magnetic circuit that includes magnet 30, top yoke 32 and partial bottom yoke 34. If the plate 12 was not made of soft magnetic material, then the thickness of the lower yoke would have to be increased to carry the magnetic flux of the magnet, thereby increasing the overall height of the disk drive.

Figure 5:
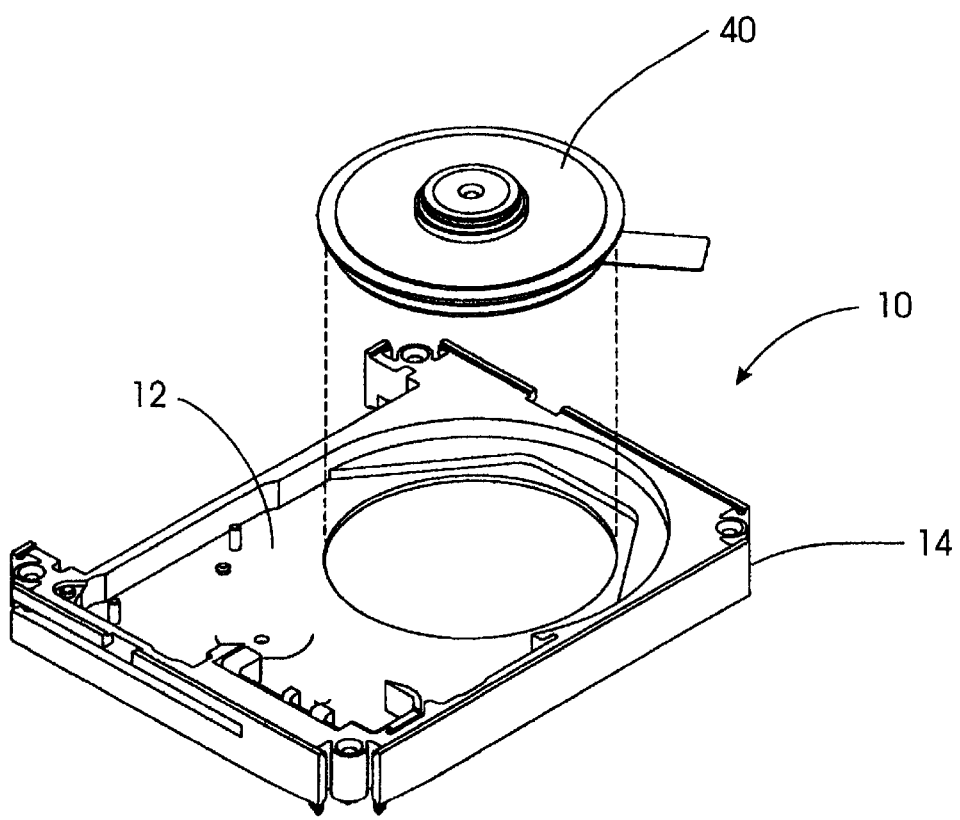
FIG. 5 is a perspective view of the composite base showing the mounting of a self-contained spindle motor assembly to the metal plate of the base.
Figure 6:
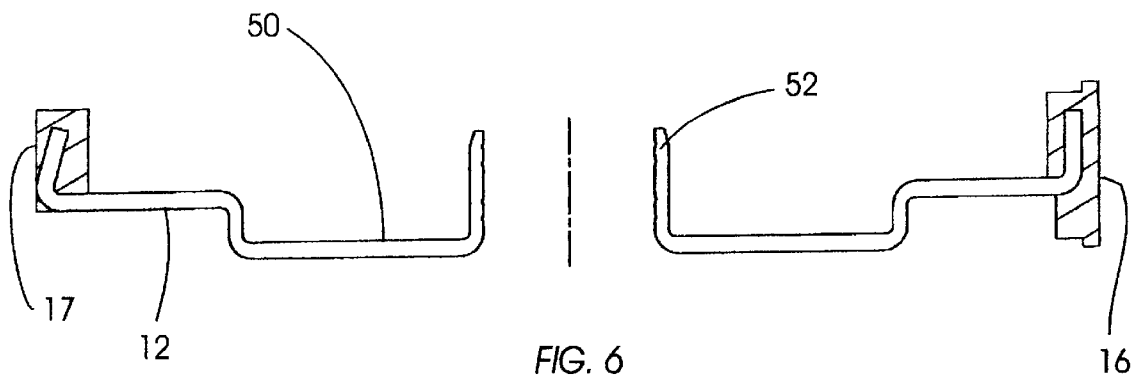
FIG. 6 is a sectional view of a portion of the metal plate showing a central post for the attachment of spindle motor bearings.

The base 10 may be designed to accept a separate spindle motor assembly, or it may be designed with features that allow the spindle motor to be built into and retained by the plate 12, in which case the plate 12 also serves as the spindle motor base. The design of base 10 shown in FIG. 1 has a large opening 24 that accepts a separate self-contained spindle motor assembly 40, as shown in FIG. 5. FIG. 6 shows a cross section of the plate 12 where the base is designed to retain the spindle motor by having the spindle motor built inside it. The depression 50 around the central cylindrical hollow post 52 provides room for the spindle motor stator windings, while the post 52 defines a central bore that accommodates the spindle motor bearings. The spindle motor bearings are attached to the inner wall of the post 52 with adhesive or other means, such as press fitting. Grooves may be machined or otherwise fabricated on the inner wall of the post 52 to assist with adhesive bonding. In the embodiment of FIG. 6, the post 52 is formed by extruding the metal of plate 12. However, the post for the spindle motor bearings may be a machined metal column which is attached to a hole in the plate by swaging, or a molded plastic column may be used.

Figure 7:
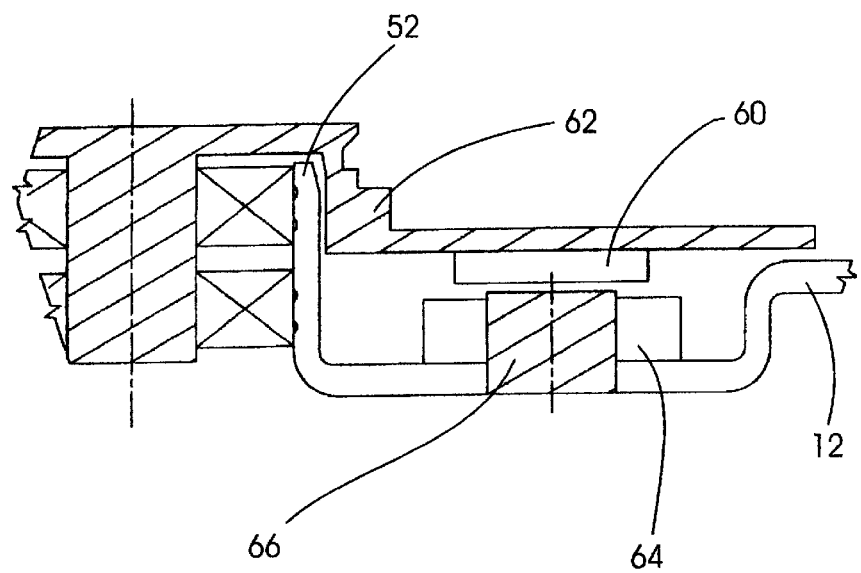
FIG. 7 is a sectional view of a portion of the base showing the metal plate as part of the magnetic circuit of the spindle motor.

The composite base 10 allows conventional radial-gap and axial-gap spindle motors to be built into the base in a manner such that the metal plate 12 functions as part of the magnetic circuit of the spindle motor. FIG. 7 is a sectional view showing a conventional axial-gap spindle motor in which the soft magnetic sheet metal plate 12 of base 10 serves as part of the magnetic circuit of the axial gap spindle motor. A ring magnet 60 mounted on a rotatable hub 62 forms part of the spindle motor's magnetic circuit. Stator coils, such as coil 64, are wound around vertically oriented cores, such as core 66, which physically contact the soft magnetic sheet metal plate 12. Magnetic flux between adjacent stator coils is carried by the sheet metal plate 12. The design of FIG. 7 has the advantage of not requiring space for separate magnetic and physical support structures. Such sharing of functionality by the sheet metal plate frees up space for increasing the size of the stator coils or rotor magnets, or allows the overall size of the spindle motor to be reduced.

For lowest cost, the sheet metal plate is made by stamping and forming. A suitable post for the spindle motor bearings can be formed by extruding a hollow cylindrical post from the sheet metal of the plate, by attaching a separately manufactured cylindrical component by swaging or other means, or by molding a cylinder out of plastic simultaneously with the molding of the plastic frame 14.

Figure 8:
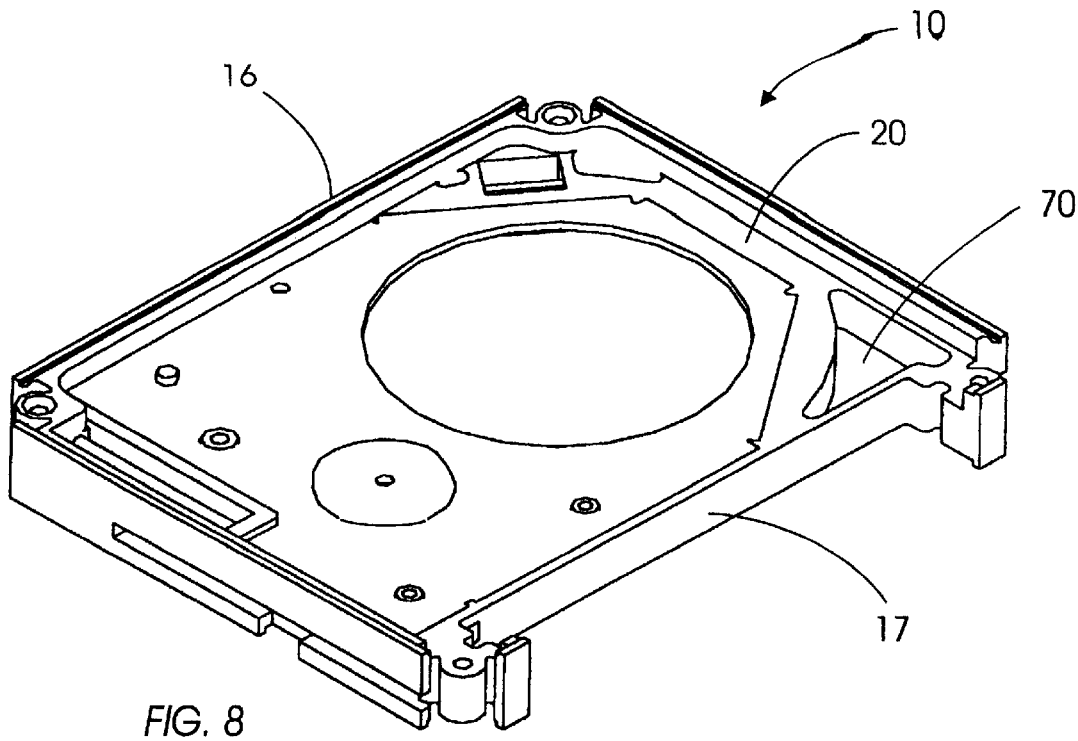
FIG. 8 is a perspective view of the bottom of the composite disk drive base of the present invention shoing cavities in the body portion of the plastic frame.

The base 10 is designed to accommodate an electronics board or card on its bottom side. FIG. 8 shows the bottom of base 10. Since disk drive electronics cards include a variety of components of varying heights, it is advantageous to provide cavities in the bottom of the body portion 20 of frame 14 to accommodate tall components. Such a cavity 70 is shown in FIG. 8.

To protect the miniature disk drive from high levels of acceleration during impact, which may occur if the drive is dropped, resilient bumpers made of elastomeric material may be placed at the corners of the plastic frame. The corner bumpers may be attached to the frame as separate units, or may be molded onto the base. If they are attached as separate units, they may be attached by inserting into slots, snapping into holes, or held in place by adhesive. If the bumpers are molded in place on the frame, they can be molded in the same cavity used for the frame, with a movable structure blocking off the region of the bumpers during injection molding of the plastic for the frame, followed by a repositioning of the movable structure and molding of the elastomeric material in the corners to from the bumpers. A mechanical interlocking structure may be provided on the plastic frame at the corners so that the elastomeric bumper material flows around or through the structure to anchor the bumpers in place. The bumpers may be formed of any conventional elastomeric material, such as polyurethane.

Figure 9:
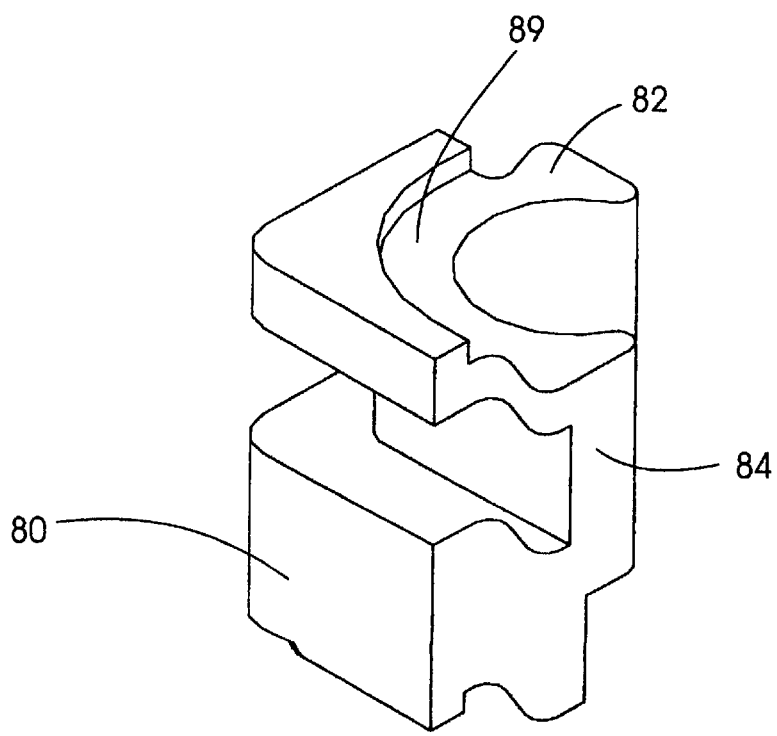
FIG. 9 is a perspective view of an elastomeric bumper for attachment to the corners of the plastic frame.

The preferred corner bumper and means of attachment is made possible in the present invention because the frame is made of plastic. One of the corner bumpers is shown in FIG. 9. The bumper 80 has "puzzle piece" shaped extensions 82, 84 that are shaped to be inserted into cutouts 86, 88 (FIG. 1) of the plastic frame 14. The resulting mechanical interlocking of the bumpers is not possible with conventional die-cast aluminum disk drive bases because it is impossible to make the intricate small cutouts. The shape of the cutouts constraining the bumpers from movement in a plane parallel to the plate 12. The bumpers are constrained from movement perpendicular to the plate 12 when the top and bottom covers are attached to the drive because the covers overlap the extensions 82, 84. As shown in FIG. 9, the rounded corner of the top cover resides in the semicircular recess 89 of the bumper 80, thus permitting each bumper to extend beyond the outer periphery of the covers and to have a height exceeding the height of the disk drive when the covers are in place so as to provide the required impact protection.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
    a base comprising a generally planar metal plate having an outer perimeter and a flange extending at an angle from the plane of the plate around at least a portion of the plate perimeter, and a plastic frame encapsulating the flange and surrounding the perimeter of the metal plate, the plastic frame having perimeter walls oriented generally perpendicularly to the plate with the plastic of the frame being incorporated into the holes of the flange to provide mechanical interlocking of the plastic frame to the metal plate;
    a spindle motor attached to a first side of the metal plate;
    a magnetic recording disk attached to and rotatable by the spindle motor;
    a voice coil motor actuator attached to said first side of the metal plate;
    a head attached to and movable by the actuator for reading or writing data on the disk;
    an electronics card attached to the other side of the metal plate;
    a top cover attached to the plastic frame for covering the spindle motor and actuator; and
    a bottom cover attached to the plastic frame for covering the electronics card.

2. The disk drive according to claim 1 wherein the flange of the metal plate extends generally perpendicularly from the plate.

3. The disk drive according to claim 1 wherein the flange of the metal plate is a sloped flange that extends from the plate at a nonperpendicular angle.

4. The disk drive according to claim 1 wherein the plastic frame is attached to the flange of the plate by injection molding.

5. The disk drive according to claim 1 wherein the plastic frame includes a body portion located between the walls.

6. The disk drive according to claim 5 wherein the walls converge at corners of the frame, and further comprising elastomeric bumpers attached to the frame at the corners.

7. The disk drive according to claim 6 wherein the corners of the frame have cutouts, and wherein the bumpers have projections inserted into the corner cutouts.

8. The disk drive according to claim 5 wherein the body portion of the plastic frame includes a cavity.

9. The disk drive according to claim 1 wherein the metal plate is formed of soft magnetic metal.

10. The disk drive according to claim 1 wherein the metal plate is made of material selected from the group consisting of permalloy, permendur, 1010 steel, and iron.

11. The disk drive according to claim 1 wherein the plastic frame is made of material selected from the group consisting of liquid crystal polymers, polycarbonate, polyimide, polyphenylene sulfide, polysulfone, nylon, and polyetherimide.

12. The disk drive according to claim 1 wherein the plastic frame includes nonplastic filler material.

13. The disk drive according to claim 1 wherein the metal plate is formed of soft magnetic material and forms part of the magnetic circuit of the voice coil motor actuator.

14. The disk drive according to claim 1 wherein the metal plate is formed of soft magnetic material and forms part of the magnetic circuit of the spindle motor.

15. The disk drive according to claim 1 wherein the metal plate has an opening for mounting of the spindle motor.

16. The disk drive according to claim 1 wherein the metal plate has a recessed region for retaining the spindle motor.

17. The disk drive according to claim 16 wherein the recessed region includes a hollow post formed as an extrusion of the metal plate for supporting the bearings of the spindle motor.

18. The disk drive according to claim 16 further comprising a plastic cylindrically shaped hollow post in the recessed region for supporting the bearings of the spindle motor.

* * * * *